United States Patent [19]

Riley

[11] Patent Number: 4,807,243

[45] Date of Patent: Feb. 21, 1989

[54] TWO-PIECE LASER CATHODE ASSEMBLY

[75] Inventor: David C. Riley, Eugene, Oreg.

[73] Assignee: Spectra-Physics, Inc., San Jose, Calif.

[21] Appl. No.: 193,811

[22] Filed: May 12, 1988

[51] Int. Cl.4 .............................................. H01S 3/097
[52] U.S. Cl. .......................................... 372/87; 372/61
[58] Field of Search ............................... 372/86, 87, 61

[56] References Cited

U.S. PATENT DOCUMENTS

| 3,766,487 | 10/1973 | Raid ...................................... | 372/61 |
| 4,326,178 | 4/1982 | Van den Brink et al. ............ | 372/61 |
| 4,328,467 | 5/1982 | Van den Brink et al. ............ | 372/61 |

*Primary Examiner*—Leon Scott, Jr.
*Attorney, Agent, or Firm*—Killworth, Gottman, Hagan & Schaeff

[57] ABSTRACT

A laser with a central axis has an outer envelope and a bore tube mounted within the envelope and coaxially along the central axis with a free end of the bore tube being spaced axially from an end of the envelope. A two-piece cathode assembly which is used in the laser includes a cylindrical cathode tube having opposite open ends and adapted to be positioned within the outer envelope in radially inward spaced relation thereto and adjacent the one end thereof. Also, the assembly includes a cathode end cap having a body portion and an outer peripheral rim portion surrounding and formed integrally on the body portion. The end cap at its outer peripheral rim portion mounts the cathode tube at one end thereof by being press-fitted therein. The body portion of the end cap has an interior surface defined thereon facing toward the free end of the bore tube and being of a concave curvature, either spherical or elliptical, for promoting achievement of a substantially uniform electrical discharge between the bore tube free end and the interior surface of the end cap body portion.

14 Claims, 2 Drawing Sheets

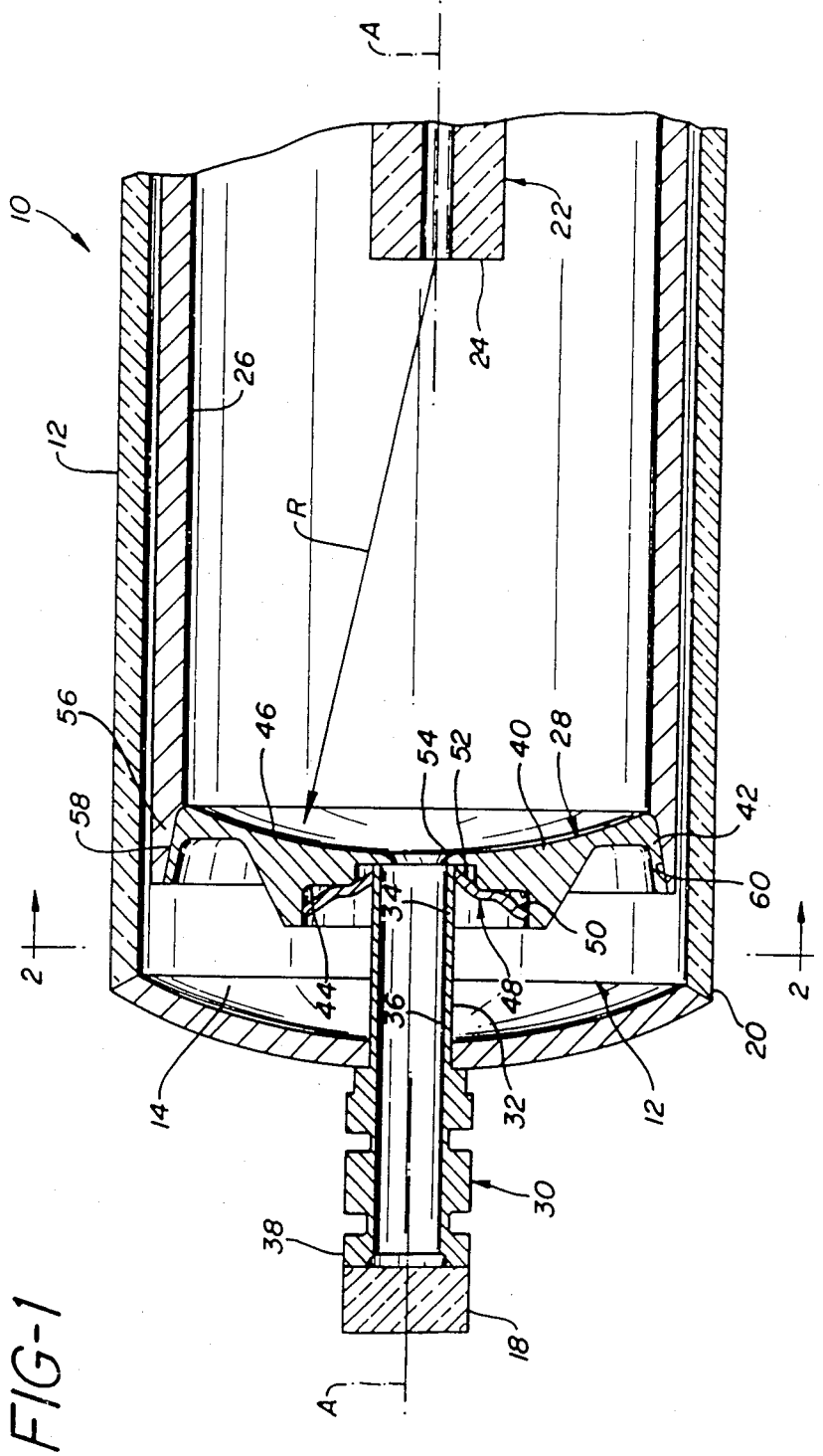

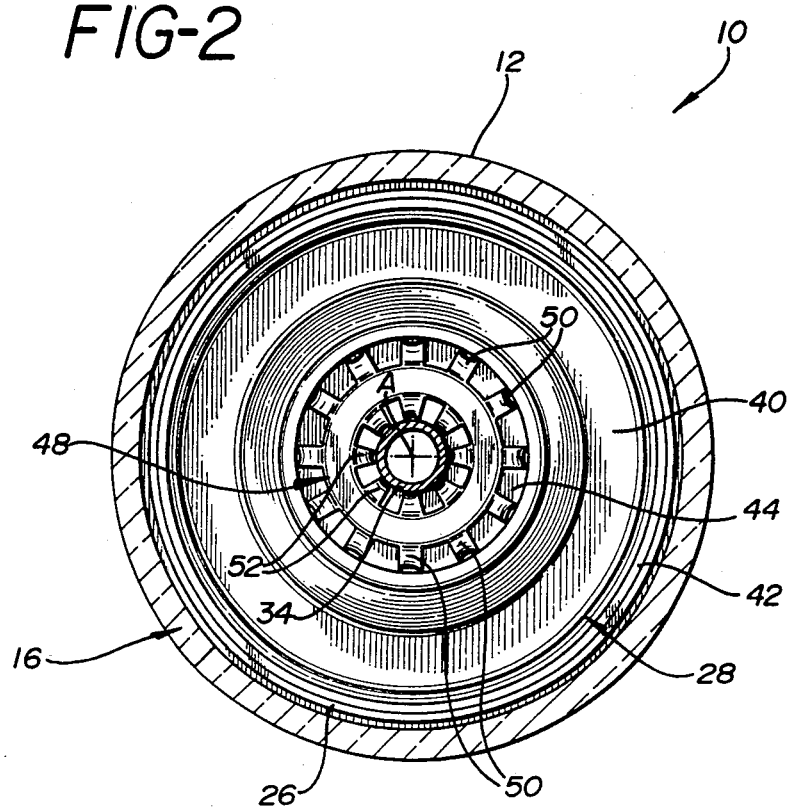

TWO-PIECE LASER CATHODE ASSEMBLY

BACKGROUND OF THE INVENTION

The present invention generally relates to lasers and, more particularly, to a two-piece laser cathode assembly with an end cap having a concave interior surface providing uniform equipotential discharge characteristics.

A conventional gas discharge laser, such as a helium-neon gas laser, typically includes an outer envelope which mounts components at its opposite ends defining an anode and a cathode. End mirrors are mounted adjacent opposite ends of the envelope by the anode and cathode components, and a bore tube is mounted within the envelope and in alignment with the end mirrors. The bore tube and end mirrors are precisely aligned along a common, central axis to form an optical resonant cavity and produce optimum lasing action.

The lasing action which produces the laser beam takes place in the bore tube between the end mirrors as a high voltage direct current is applied between the anode and cathode and through a mixture of helium and neon gases being contained in the outer envelope at a small fraction of atmospheric pressure. Application of the high voltage direct current produces a discharge which flows from the anode through the bore tube and from the free end of the bore tube to the spaced cathode.

Heretofore, the construction of the laser cathode has ordinarily been in the form of a two-piece cylindrical cathode tube and a flat end cap. The flat configuration of the end cap has tended to cause a nonuniform, localized discharge being concentrated more at the central region of the end cap than at the peripheral region thereof. Such nonuniform discharge distribution shortens the life of the cathode and thereby reduces the longevity of the laser.

Those cathode designs in the prior art which have employed two-piece constructions have not specifically dealt with the problem of nonuniform discharge. On the other hand, the concept of uniform distribution of electrical discharge has been addressed heretofore in a one-piece cathode construction, wherein an internal spherical surface was provided on the end of the one-piece cathode. However, the one-piece cathode was fabricated by a deep-drawing process which was expensive and difficult to carry out satisfactorily. Therefore, the one-piece cathode approach did not prove to be an acceptable answer to the problem of nonuniform discharge.

In view of the above-described shortcomings of prior art cathode construction, a need still remains for an alternative approach to cathode design and construction which addresses and resolves the outstanding problem of nonuniform electrical discharge distribution.

SUMMARY OF THE INVENTION

The present invention provides a laser cathode assembly designed to satisfy the aforementioned needs. The cathode assembly of the present invention is composed of two separate pieces, a cathode end cap and a cylindrical cathode tube. The end cap is mounted to one end of the cathode tube, such as being press-fitted therein. The end cap has a concave interior surface promoting achievement of a substantially uniform equipotential discharge between the bore tube of the laser and the interior surface.

More particularly, the cathode end cap has a body portion and an outer peripheral rim portion surrounding and formed integrally on the body portion. The end cap is adapted at its outer peripheral rim portion to be mounted to the one end of the cathode tube. Specifically, the rim portion of the cathode end cap has an outwardly flared configuration and the one end of the cylindrical cathode tube has an outwardly tapered internal surface complementary to the outwardly flared configuration of the end cap rim portion for receiving the latter therein in the press-fitted relationship.

The concave interior surface on body portion of the end cap is adapted to face toward the free end of the bore tube. In one embodiment, the concave interior surface is spherical in configuration, whereas in another embodiment it is elliptical in configuration.

Accordingly, it is an object of the present invention to provide a laser cathode assembly of two-piece construction, having an interior concave surface; to provide such a cathode assembly which is less expensive and difficult to fabricate; and to provide such a cathode assembly which substantially optimizes the interior surface electrical discharge characteristics of the assembly.

BRIEF DESCRIPTION OF THE DRAWINGS

FIG. 1 is a longitudinal axial sectional view of an end portion of a laser employing a cathode assembly constructed in accordance with the principles of the present invention.

FIG. 2 is an end elevational view, partly in section, of the cathode assembly as seen along line 2—2 of FIG. 1.

DETAILED DESCRIPTION OF THE PREFERRED EMBODIMENT

Reference is made to FIGS. 1 and 2 of the drawings which illustrate an end portion of a laser 10, such as a gas discharge type laser. In its basic components, the laser 10 includes an outer envelope 12 providing a cavity 14 filled with a gaseous mixture of helium and neon. An anode (not shown) and a cathode 16, being improved in accordance with the principles of the present invention, as located at opposite ends of the envelope. Also, end mirrors 18 (only the one at the cathode end 20 of the envelope 12 being shown) are mounted adjacent respective ends of the outer envelope 12, and a bore tube 22 having a free end 24 is mounted in coaxial relation with the envelope 12 within the cavity 14. To produce the desired lasing action, the bore tube 22 and end mirrors 18 are precisely aligned along a common central axis A of the laser 10.

In accordance with the present invention, the cathode 16 is basically a two-piece assembly which includes a cylindrical cathode tube 26 and a cathode end cap 28. Also, support means in the form of a tubular cathode post or mirror mount 30 is attached to the cathode end 20 of the outer envelope 12 and has a tubular extension 32 extending into the cavity 14 of the envelope 12 with an inner end 34 disposed in spaced relation to the free end 24 of the bore tube 22. A central passage 36 extends through the mirror mount 30 and extension 32 and is coaxially aligned with the central axis A of the laser 10. The cathode mirror 18 is mounted to an outer end 38 of the mirror mount 30, such as by being adhesively bonded thereto, so as to extend generally perpendicular to the central axis A of the laser 10.

The cathode end cap 28 has a body portion 40 and an outer peripheral rim portion 42 surrounding and formed integrally on the body portion 40. The end cap body portion 40 is mounted to the inner end 34 of the mirror mount extension 32 in coaxial relation with the central axis A, and has an exterior surface 44 and an interior surface 46 defined thereon.

More particularly, the end cap body portion 40 is mounted to the inner end 34 of the mirror mount extension 32 by a flexure member 48. The flexure member 48 preferably takes the form of an annular spider clip having yieldable elements thereon in the form of outer and inner peripheral series of radially-projecting, circumferentially-spaced locking legs 50, 52. The respective legs 50, 52 provide substantially rigid locking interengagement of the cathode end cap body portion 40 at its exterior surface 44 with the extension inner end 34. The body portion 40 of the cathode end cap 28 and the exterior and interior surfaces 44, 46 thereon have a central opening 54 defined therethrough which communicates with the central passage 36 through the mirror mount 30.

The cylindrical cathode tube 26 of the cathode assembly 16 is mounted at one of its open ends 56 to the outer peripheral rim portion 42 of the cathode end cap 28 such that the cathode tube 26 extends within the outer envelope cavity 14 in radially inward spaced relation thereto and adjacent to the cathode end 20 thereof and also past and in radially outward spaced overlying relation to the free end 24 of the bore tube 22. More particularly, the outer peripheral rim portion 42 of the cathode end cap 28 has an annular outwardly flared configuration at 58 and the one end 56 of the cathode tube 26 has an annular outwardly tapered internal surface 60 complementary to the outwardly flared configuration 58 of the end cap rim portion 42 for receiving the latter therein in a substantially rigid press-fitted relationship, as seen in FIG. 1.

The interior surface 46 on the end cap body portion 40 faces toward the free end 24 of the bore tube 22. The interior surface 46 has a general concave curvature extending coaxially about the central axis A of the laser 10 for promoting achievement of a substantially uniform electrical discharge between the bore tube free end 24 and the end cap body portion 40 at the interior surface 46. In the embodiment of FIG. 1, the concave interior surface 46 on the body portion 40 of the cathode end cap 28 is spherical in configuration, being struck by a radius R originating at the free end 24 of the bore tube 22 and terminating at the center of the end cap body portion 40.

Alternatively, the concave interior surface 46 on the end cap body portion 40 (not shown) could be elliptical in configuration. The surface would be struck by rotation of an ellipse with its major axis extending axially from the center of the end cap body portion 40 to the center of the end cap body portion, and its minor axis extending across the inside diameter of the cylindrical cathode tube 26 through the free end of the bore tube.

Having thus described the laser mirror alignment mechanism of the present invention in detail and by reference to a preferred embodiment thereof, it will be apparent that modifications and variations are possible without departing from the scope of the invention defined in the appended claims.

What is claimed is:

1. A two-piece cathode assembly for a laser with a central axis and having an outer envelope and a bore tube mounted within the envelope and coaxially along the central axis with a free end of the bore tube being spaced axially from one end of the envelope, said cathode assembly comprising:

a cylindrical cathode tube having opposite open ends and adapted to be positioned within the outer envelope in radially inward spaced relation thereto and adjacent the one end thereof; and a cathode end cap having a body portion and an outer peripheral rim portion surrounding and formed integrally on said body portion, said end cap being adapted at its outer peripheral rim portion to be mounted to one end of said cathode tube, said body portion of said end cap having an interior surface defined thereon adapted to face toward the free end of the bore tube and being of a concave curvature for promoting achievement of a substantially uniform electrical discharge between the bore tube free end and said interior surface of said end cap body portion.

2. The assembly of claim 1 in which said rim portion of said cathode end cap is adapted to be press-fitted with said one end of said cylindrical cathode tube.

3. The assembly of claim 1 in which said rim portion of said cathode end cap has an outwardly flared configuration and said one end of said cylindrical cathode tube has an outwardly tapered internal surface complementary to said outwardly flared configuration of said end cap rim portion for receiving the latter therein in a press-fitted relationship.

4. The assembly of claim 1 in which said body portion of said cathode end cap and said concave interior surface thereon have a central opening defined therethrough.

5. The assembly of claim 1 in which said concave interior surface on said body portion of said cathode end cap is spherical in configuration being struck by a radius originating at the free end of the bore tube and terminating at the center of said end cap body portion.

6. The assembly of claim 1 in which said concave interior surface on said body portion of said cathode end cap is elliptical in configuration being struck by rotation of an ellipse with its major axis extending axially from the center of said end cap body portion through a distance equal to two times the distance from the free end of the bore tube to the center of said end cap body portion and its minor axis extending across the inside diameter of said cylindrical cathode tube through the free end of the bore tube.

7. The assembly of claim 1 in which said outer peripheral rim portion of said cathode end cap has an outwardly flared configuration and said one end of said cylindrical cathode tube has an outwardly tapered internal surface complementary to said outwardly flared configuration of said end cap rim portion for receiving the latter therein in a press-fitted relationship.

8. In a laser having a central axis, an outer envelope, and a bore tube mounted within said envelope and coaxially along said central axis with a free end of said bore tube being spaced axially from an end of said envelope, a two-piece cathode assembly comprising:

support means mounted to said one end of said outer envelope and extending therein in spaced relation to said free end of said bore tube;

a cathode end cap having a body portion and an outer peripheral rim portion surrounding and formed integrally on said body portion, said body portion of said end cap being mounted to said support means in coaxial relation with said central axis and having an interior surface defined thereon adapted to face toward the free end of the bore tube, said interior surface being of a concave curvature extending coaxially about the central axis for promoting achievement of a substantially uniform electrical discharge between the bore tube free end and said interior surface of said end cap body portion; and a cylindrical cathode tube being mounted at an open end to said outer peripheral rim portion of said cathode end cap in a position within said outer envelope in radially inward spaced relation thereto and adjacent the one end thereof.

9. The assembly of claim 8 in which said outer peripheral rim portion of said cathode end cap is press-fitted with said one end of said cylindrical cathode tube.

10. The assembly of claim 7 in which said body portion of said cathode end cap and said concave interior surface thereon have a central opening defined therethrough.

11. The assembly of claim 7 in which said concave interior surface on said body portion of said cathode end cap is spherical in configuration, being struck by a radius originating at said free end of said bore tube and terminating at the center of said end cap body portion.

12. The assembly of claim 7 in which said concave interior surface on said body portion of said cathode end cap is elliptical in configuration, being struck by rotation of an ellipse with its major axis extending axially from the center of said end cap body portion through a distance equal to two times the distance from said free end of said bore tube to the center of said end cap body portion and its minor axis extending across the inside diameter of said cylindrical cathode tube through said free end of said bore tube.

13. The assembly of claim 7 in which said support means is a cathode post and flexure member having yieldable elements thereon for providing locking interengagement of said cathode end cap central portion at an exterior surface thereon with an inner end of said post.

14. The assembly of claim 13 in which said flexure element is an annular spider clip having a circumferential series of locking legs formed about outer and inner peripheries thereof.

* * * * *